United States Patent
Yoo et al.

(10) Patent No.: US 7,454,125 B2
(45) Date of Patent: *Nov. 18, 2008

(54) METHOD AND APPARATUS FOR RECORDING SEARCH INFORMATION AND SEARCHING FOR RECORDED DIGITAL DATA STREAMS USING THE SEARCH INFORMATION

(75) Inventors: Jea-Yong Yoo, Seoul (KR); Kang-Soo Seo, Kyunggido (KR); Byung-Jin Kim, Kyunggido (KR)

(73) Assignee: LG Electronics INC., Seoul (KR)

( * ) Notice: Subject to any disclaimer, the term of this patent is extended or adjusted under 35 U.S.C. 154(b) by 1362 days.

This patent is subject to a terminal disclaimer.

(21) Appl. No.: 09/924,979

(22) Filed: Aug. 8, 2001

(65) Prior Publication Data

US 2001/0048804 A1 Dec. 6, 2001

Related U.S. Application Data

(63) Continuation-in-part of application No. 09/467,965, filed on Dec. 21, 1999.

(30) Foreign Application Priority Data

Jan. 4, 1999 (KR) ...................... 10-1999-0000603

(51) Int. Cl.
  H04N 5/00 (2006.01)
  H04N 7/26 (2006.01)
(52) U.S. Cl. ...................... 386/125; 386/124
(58) Field of Classification Search ............ 386/111, 386/112, 109, 124, 125, 126, 105, 106, 45, 386/1, 46
See application file for complete search history.

(56) References Cited

U.S. PATENT DOCUMENTS

| 5,168,356 A | 12/1992 | Acampora et al. |
| 5,390,027 A | 2/1995 | Henmi et al. |
| 5,701,383 A | 12/1997 | Russo et al. |
| 5,771,334 A | 6/1998 | Yamauchi et al. |

(Continued)

FOREIGN PATENT DOCUMENTS

EP 0 215 133 3/1987

(Continued)

OTHER PUBLICATIONS

Bernhard Krieg, "Digitale Audiotechnik ohne Baliast", Reference Book, published by Franzis-Verlag 1992, cover sheet, inside page, pp. 166 to 187.

*Primary Examiner*—Robert Chevalier
(74) *Attorney, Agent, or Firm*—Birch, Stewart, Kolasch & Birch, LLP

(57) ABSTRACT

An apparatus and method for creating and recording management information for searching recorded digital data streams is described. When a digital data stream is recorded on a recording medium, index information for pointing to the location of the time information corresponding to the first stream object unit of each stream object on a time information table is created and recorded. Alternatively, the index information contains the number of start stream object unit for the selected stream object. When reproducing or searching the recorded digital data stream, a stream object is found using the time information of stream objects and the recording location corresponding to a requested search time is found using the index information.

33 Claims, 7 Drawing Sheets

U.S. PATENT DOCUMENTS

| | | | |
|---|---|---|---|
| 6,006,004 A | 12/1999 | Moriyama et al. | |
| 6,078,727 A | 6/2000 | Saeki et al. | |
| 6,167,189 A | 12/2000 | Taira et al. | |
| 6,259,858 B1 | 7/2001 | Ando et al. | |
| 6,285,825 B1 | 9/2001 | Miwa et al. | |
| 6,343,180 B1 | 1/2002 | Kim et al. | |
| 6,408,338 B1 | 6/2002 | Moon et al. | |
| 6,470,135 B1 | 10/2002 | Kim et al. | |
| 6,553,086 B1 | 4/2003 | Yoo et al. | |
| 6,580,873 B2 | 6/2003 | Ando et al. | |
| 7,050,702 B2 * | 5/2006 | Ando et al. | 386/105 |
| 2006/0190467 A1 * | 8/2006 | Kim et al. | 707/100 |
| 2008/0075421 A1 * | 3/2008 | Kim et al. | 386/69 |

FOREIGN PATENT DOCUMENTS

| | | |
|---|---|---|
| EP | 0 797 204 A2 | 3/1997 |
| EP | 0 797 204 A2 | 9/1997 |
| JP | 03-093084 A | 4/1991 |
| JP | 03-093085 | 4/1991 |
| JP | 05-074053 A | 3/1993 |
| JP | 08-031106 A | 2/1996 |
| JP | 08-124362 | 5/1996 |
| JP | 08-212761 A | 8/1996 |
| JP | 09-023404 A | 1/1997 |
| JP | 10-154389 A | 6/1998 |
| JP | 10-320914 | 12/1998 |
| JP | PCT/JP00/01653 | 9/2000 |
| WO | WO-95/23411 | 8/1995 |

* cited by examiner

FIG. 2

| TOC/SI (applicat.IFO) | Play List (common.IFO) | | | STMAPI (streamer.IFO) | |
|---|---|---|---|---|---|
| | User Defined Playlist | Original Playlist | Cell Layer | Stream Time Map General Information (STMAP_GI) | Mapping List (MAPL) |

| TOC/SI for RCD 1 | TOC/SI for RCD 2 | TOC/SI for RCD 3 |
|---|---|---|

| RCD 1 | RCD 2 | RCD 3 |
|---|---|---|
| Cell 1 | Cell 2 | Cell 3 |
| SOB 1 | SOB 2 | SOB 3 |
| MAPL 1 | MAPL 2 | MAPL 3 |

FIG. 5

| | |
|---|---|
| MAPU_ENT # K-1 (3) | ⋮ |
| MAPU_ENT # K (3) | |
| MAPU_ENT # K+1 (4) | C_MAP_ENT # K (X) |
| MAPU_ENT # K+2 (2) | |
| ⋮ | ⋮ |
| MAPU_ENT # K+M (2) | |
| MAPU_ENT # K+M+1 (2) | |
| MAPU_ENT # K+M+2 (3) | |
| MAPU_ENT # K+M+3 (4) | C_MAP_ENT # M (25) |
| MAPU_ENT # K+M+4 (3) | |
| MAPU_ENT # K+M+5 (4) | |
| MAPU_ENT # K+M+6 (3) | |
| MAPU_ENT # K+M+7 (4) | |
| MAPU_ENT # K+L (5) | |
| ⋮ | ⋮ |
| MAPU_ENT # K+N (4) | C_MAP_ENT # N (Y) |
| MAPU_ENT # K+N+1 (4) | |

SOB #n

METHOD AND APPARATUS FOR RECORDING SEARCH INFORMATION AND SEARCHING FOR RECORDED DIGITAL DATA STREAMS USING THE SEARCH INFORMATION

CROSS REFERENCE TO RELATED ART

This application claims the benefit of Korean Patent Application No. 1999-00603, filed on Jan. 4, 1999, which is hereby incorporated by reference in its entirety.

This is a continuation-in-part of application Ser. No. 09/467,965, filed Dec. 21, 1999 which is hereby incorporated by reference in its entirety.

BACKGROUND OF THE INVENTION

1. Field of the Invention

The present invention relates to a method and an apparatus for creating a search information for searching digital data streams recorded on a recording medium and relates to a method and apparatus for searching requested data using the search information.

2. Description of the Related Art

In conventional analog television broadcasts, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcasting industries are also moving towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communications media or digital storage media.

In digital broadcast, a plurality of programs encoded based upon the MPEG format are multiplexed into a single transport stream before transmitted. The transmitted transport stream is received by a set top box at the receiver and demultiplexed into original programs. If a program is chosen from among the demultiplexed programs, the chosen program is decoded by a decoder in the set top box and the original audio and video signals are retrieved. The retrieved audio and video signals can be presented by an A/V output apparatus, such as a TV.

It is also possible to record the received digital broadcast signals on a storage medium instead of directly outputting the received broadcast signals to A/V output devices. The stored digital broadcast signals can be edited and retrieved afterwards. For example, a digital data stream received by the set top box can be transmitted to a streamer, such as a digital video disk (DVD) recording apparatus, through communication interfaces like an IEEE-1394 serial bus and stored in the streamer. The stored digital data stream can be edited and transmitted back to the set top box so that the digital audio and video data can be presented.

For recording a received digital broadcast stream on a recording medium, it is necessary to develop schemes to organize the digital data stream on the recording medium and to create management information for rapid access to the recorded data stream.

SUMMARY OF THE INVENTION

Accordingly, the present invention is directed to a recording/reproduction apparatus and method therefor that substantially obviates one or more of the problems due to limitations and disadvantages of the related art.

An object of the present invention is to provide a method for recording received digital data streams on a recording medium as groups of stream objects and creating a search information for each stream object and a method for searching for requested data using the search information.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The method for creating and recording search information for recorded digital data streams in accordance with the present invention comprises the steps of recording a received digital data stream by grouping the received digital data stream into stream object units, creating and recording time information for each stream object unit, and creating and recording index information for pointing to the location on the time information for each stream object as management information for the stream object. When reproducing or editing the recorded digital data streams, the data recording position corresponding to a requested search time can be found with reference to the index information.

According to an embodiment of the present invention, a method for recording search information for a digital data stream using a digital recording apparatus comprises the steps of: recording the received digital data stream by grouping the received digital data stream into a plurality of stream object units, each stream object unit having a predetermined time length and at least one stream object unit forming a stream object having a start packet arrival time and a last packet arrival time; preparing a stream time map information table associated with each stream object; recording time length information for each stream object unit in a mapping list in a predefined order, the mapping list being separately maintained from the stream object; and recording index information in the stream time map information table of a selected stream object, wherein the index information includes an index number to locate a first stream object unit associated with the selected stream object.

According to one aspect of the present invention, the time length information is expressed in terms of a count value counted at a constant interval. Preferably, the count value is a number incremented by one over each constant interval.

According to another aspect of the present invention, the stream time map information table associated with each stream object contains a stream object unit size, an index number, a number of mapping list entries, a start packet arrival time and a last packet arrival time.

A method for selectively searching recorded digital data streams recorded in a recording medium comprises the steps of selecting a stream object for reproduction; locating the stream time map information table corresponding to the selected stream object; reading the index information of the stream time map information table; and locating the first stream object unit corresponding to the selected stream object.

An apparatus for recording search information for a digital data stream on a recording medium comprises recording means for receiving the digital data stream by grouping the received digital data stream into a plurality of stream object units, each stream object unit having a predetermined time length and at least one stream object unit forming a stream object having a start packet arrival time and a last packet arrival time; means for preparing a stream time map information table associated with each stream object on the recording medium; means for recording time length information for each stream object unit in a mapping list in a predefined order, the mapping list being separately maintained from the stream object; and means for recording index information in the stream time map information table of a selected stream object, wherein the index information includes an index number to locate a first stream object unit associated with the selected stream object.

An apparatus for selectively searching recorded digital data streams recorded in a recording medium comprises means for selecting a stream object for reproduction; means for locating the stream time map information table corresponding to the selected stream object; means for reading the index information of the stream time map information table; and means for locating the first stream object unit corresponding to the selected stream object.

A recording medium for use with an apparatus for recording search information for a digital data stream thereon comprises a plurality of stream object units, each stream object unit comprising a portion of the data stream and having a predetermined time length, and at least one stream object unit forming a stream object having a start packet arrival time and a last packet arrival time; a stream time map information table associated with each stream object recorded on the recording medium; a mapping list for recording time length information for each stream object unit in a predefined order, the mapping list being separately maintained from the stream object; and index information recorded in the stream time map information table for a selected stream object, wherein the index information includes an index number to locate a first stream object unit associated with the selected stream object.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 2 is the syntax of the management information created by the method for creating search information for recorded digital data streams in accordance with the present invention;

FIG. 5 is a pictorial representation for explaining the management information created by the method for creating search information for recorded digital data streams in accordance with an embodiment of the present invention;

DETAILED DESCRIPTION OF THE PREFERRED EMBODIMENTS

In order for the invention may be fully understood, preferred embodiments thereof will now be described with reference to the accompanying drawings.

Figure 1:
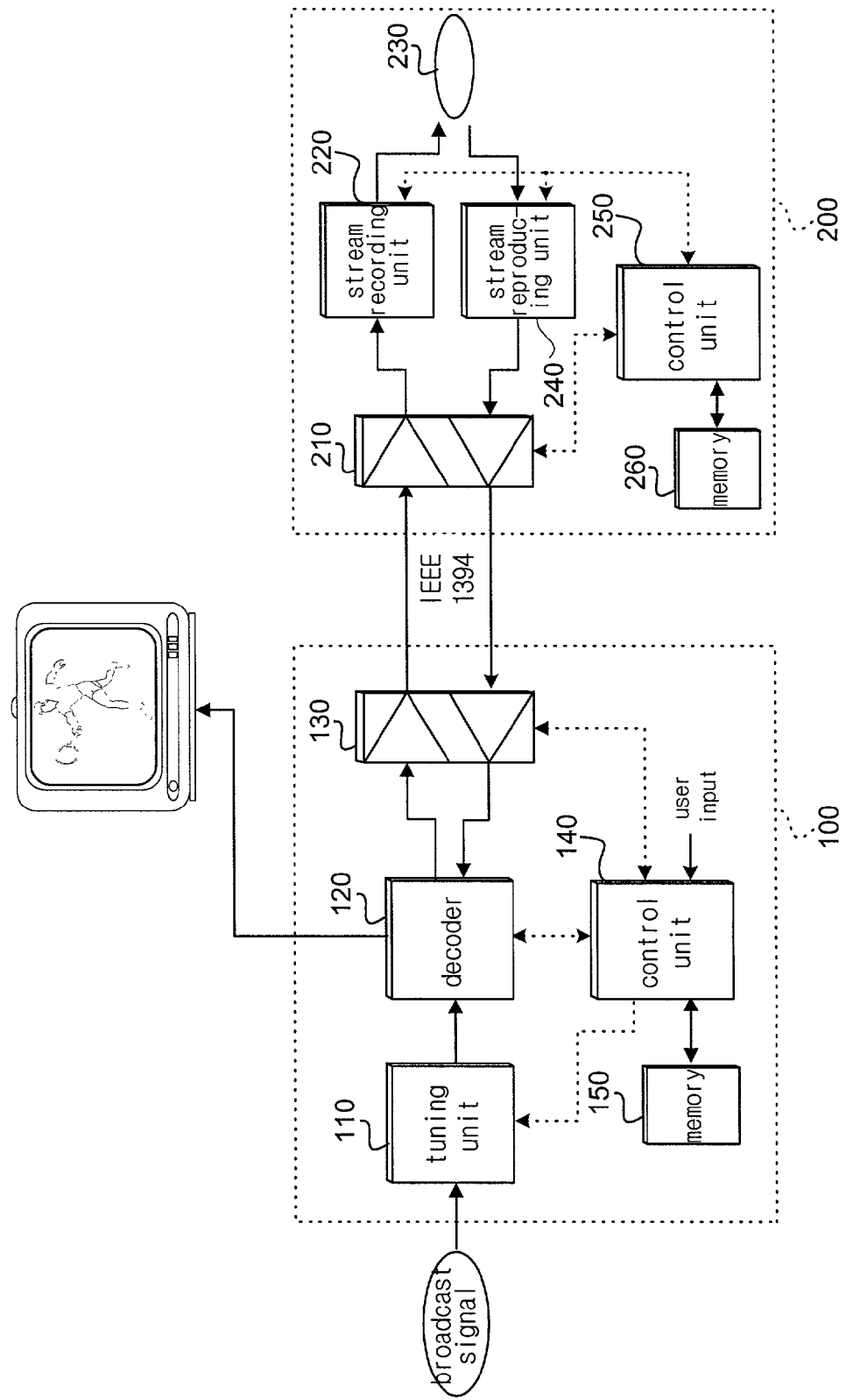
FIG. 1 is a block diagram of an apparatus in which the present invention may be advantageously employed.

FIG. 1 depicts a block diagram of an apparatus in which the present invention may be advantageously employed. The apparatus is comprised of a set top box 100, a communication interface (IEEE-1394), and a streamer 200.

The set top box 100 receives transport streams encoded by system encoders and broadcasts by a plurality of broadcasting stations and demultiplexes the received transport streams. After a system decoder 120 decodes the transport stream of a program tuned by a tuning unit 110, a control unit 140 outputs the decoded transport stream to an A/V output device, such as a TV set 125 for presentation.

The set top box 100 may transmit a program chosen by a user to the streamer 200 through the IEEE-1394 interface or other suitable interface known to one of ordinary skill in the art so that the transmitted program is recorded on a recording medium 230, such as a digital video disk, by the streamer 200.

Requested by a user, the set top box 100 may receive a program retrieved from the recording medium 230 by the streamer 200 through the IEEE-1394 communication interface so that the received program can be presented on a TV set 125 after being decoded by the decoder 120.

For carrying out these tasks, the set top box 100 and the streamer 200 should be able to access the management information regarding the programs recorded on the recording medium 230. To this end, information files are used to deal with the recorded data. An application information file is utilized by the set top box 100 and a streamer information file is utilized by the streamer 200. A common information file is utilized by both the set top box 100 and the streamer 200. These information files are recorded on the recording medium 230.

The application information file is retrieved by a stream reproducing unit 240 of the streamer 200 when the set top box 100 is initialized or requests the file. The retrieved application information is transmitted to the set top box 100 through the IEEE-1394 communication interface and loaded into the management information area M2 of a memory 150 by a control unit 140 of the set top box 100. When a new program is recorded or recorded data is edited, the application information loaded in the memory 150 is updated by the control unit 140 to include management information on the newly recorded or edited program. If a user requests retrieval of a specific program, the control unit 140 requests the streamer 200 to retrieve the program, with reference to the application information.

When the set top box 100 terminates a recording mode or is shut down, the application information in the memory 150 is transmitted through the IEEE-1394 communication interface to the streamer 200 and recorded on the recording medium 230 by a stream recording unit 220 controlled by a control unit 250 of the streamer 200.

The streamer information file and common information file are retrieved by the stream reproducing unit 240 of the streamer 200 when the streamer 200 is initialized and loaded into a memory 260 by the control unit 250 of the streamer 200.

When a new program is recorded or recorded data is edited, the streamer and common information is updated to include management information on the newly recorded or edited program by the control unit 250. If a user requests retrieval of a specific program, the control unit 250 responsive to a request signal from the set top box 100 retrieves the associated program recorded on the recording medium 230 with reference to the streamer and common information loaded in the memory 260. When the set top box 100 terminates a recording mode or is shut down, the streamer and common information in the memory 260 are recorded on the recording medium 230 by the stream recording unit 220 controlled by the control unit 250.

The syntax of the information files and the structure of recorded data according to a first embodiment of the present invention will be explained with reference to FIG. 2.

As shown in FIG. 2, the application information file (application.IFO) comprises a table of content (TOC) and a service information (SI) table. The table of content (TOC) contains random-access entry points that allow random access to the recorded data stream. The service information (SI) table contains the information on the recorded digital stream. The common information file (common.IFO) contains an original playlist automatically created when a digital data stream is recorded, presentation sequence information (Cell) of the recorded data stream, and a user-defined playlist created when a user edits the presentation sequence of the recorded data stream.

The streamer information file (streamer.IFO) is intended to deal with stream time map general information (STMAP_GI) and a mapping list (MAPL). The stream time map general information (STMAP_GI) is management information regarding stream object units (SOBUs) organized on the recording medium and stream objects (SOBs) each of which comprises a plurality of stream object units (SOBUs). The mapping list (MAPL) is time search information regarding the stream object units (SOBUs) and stream objects (SOBs). Each stream object (SOB) has a one-to-one correspondence with each Cell contained in the original playlist and each Cell is contained in the user-defined playlist and has a one-to-one correspondence with each stream object (SOB).

Figure 3:
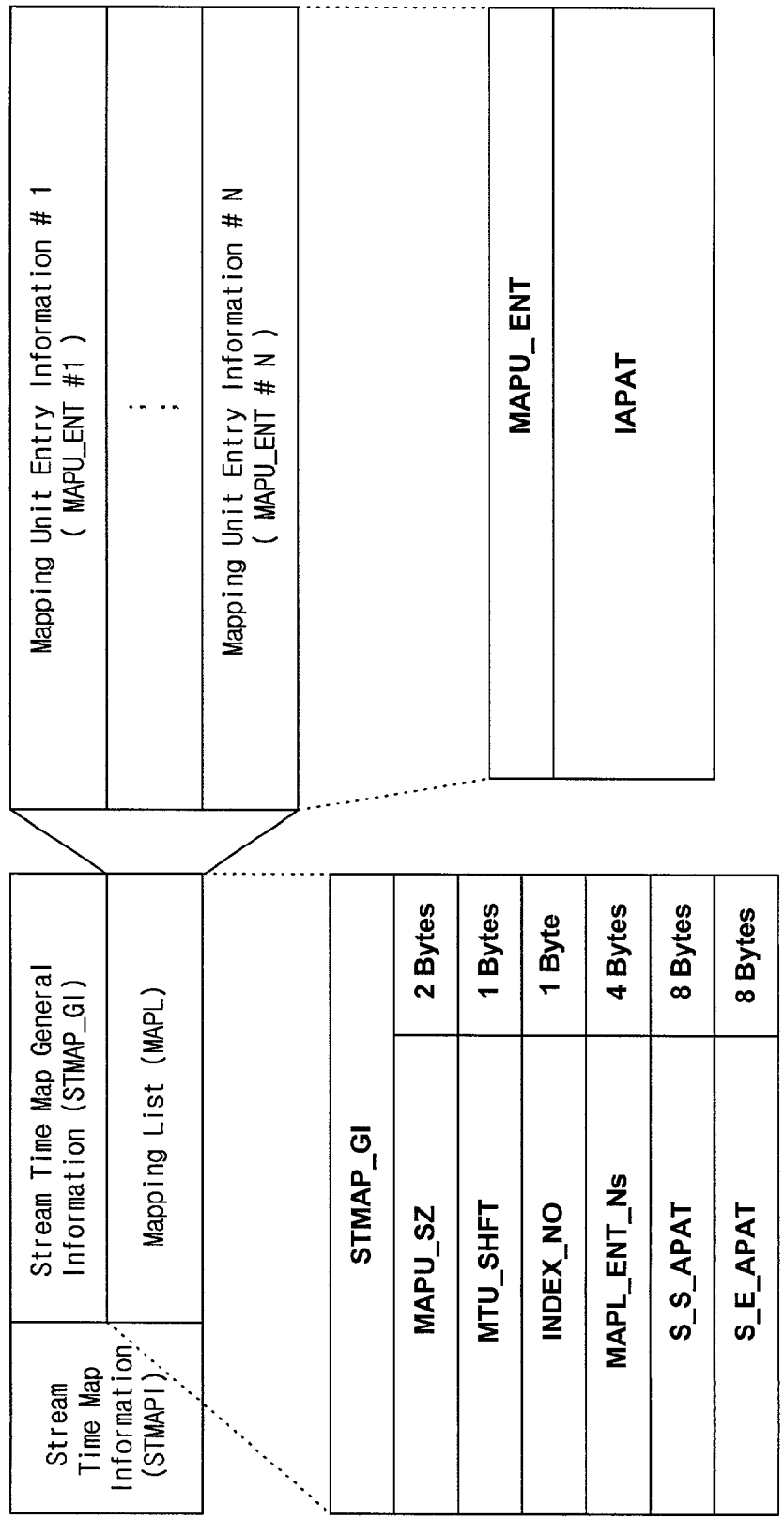
FIG. 3 is a pictorial representation of the stream time map information as a part of the management information created by the method for creating search information for recorded digital data streams in accordance with the present invention.

The stream time map general information (STMAP_GI), as shown in FIG. 3, comprises several fields representing the stream object unit size (MAPU_SZ), the weight of the LSB of the mapping list entries (MTU_SHFT), index number (INDEX_NO) indicating an arbitrary entry of the mapping list (MAPL), the number of mapping list entries (MAPL_ENT_Ns), start packet arrival time of a SOB (S_S_APAT), and last packet arrival time of a SOB (S_E_APAT). The mapping list (MAPL) comprises mapping entries (MAPU_ENT), each mapping entry containing the incremental application packet time (IAPAT).

The method for creating and recording search information for recorded digital data streams in accordance with an embodiment of the present invention will be explained with reference to FIGS. 1, 2, and 3. If a user asks for recording a received digital data stream on the recording medium 230, the control unit 140 of the set top box 100 notifies the control unit 250 of the streamer 200 that a recording mode has been set and begins to transmit the received digital data stream to the streamer 200 through the IEEE-1394 interface. Concurrently, the control unit 140 of the set top box 100 records the entry point information that allows random access to the transport stream packets of the digital data stream in the application information (application.IFO) loaded in the management information area (M2) of the memory 150 or records the entry point information in the common information (common.IFO) as part of the playlist. Also, the control unit 140 detects the information on the data stream currently being recorded from the program service information (SI) loaded in the program information area (M1) of the memory 150 and records the service information in the service information (SI) table of the application information (application.IFO).

The control unit 250 of the streamer 200 controls the stream recording unit 220 so that the data stream received through the IEEE-1394 communication interface is recorded on the recording medium 230. The data stream is organized in sectors on the recording medium 230 and a predetermined number of sectors constitute a stream object unit (SOBU). Such process is repeated until the recording mode terminates, thereby creating a stream object (SOB) which is a group of data stream recorded by a single recording operation.

Figure 4:
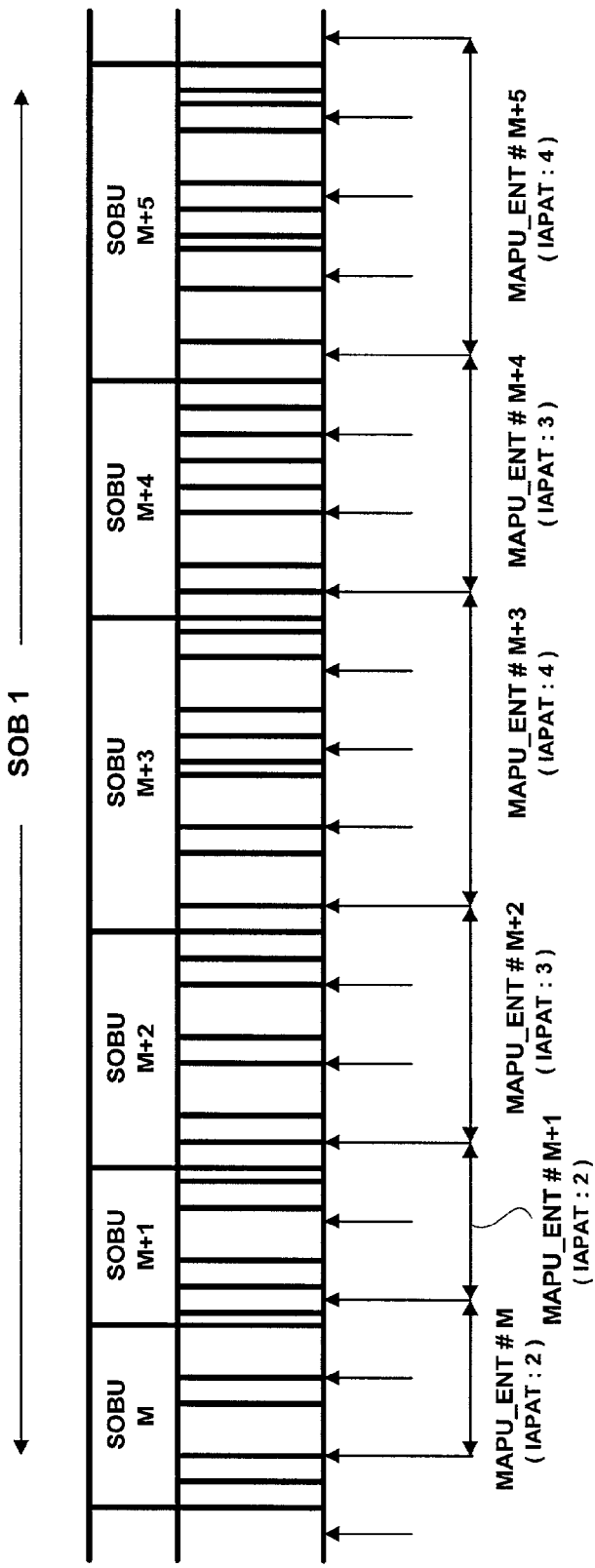
FIG. 4 is a pictorial representation for explaining the digital data stream recording operation in accordance with an embodiment of the present invention.

The control unit 250 of the streamer 200 creates a presentation sequence information (Cell) regarding the created stream object (SOB) and records the Cell in the Cell layer of the common information (common.IFO) as presentation sequence information corresponding to the record (RCD) of the original playlist. For searching for stream object units (SOBUs) constituting the stream object (SOB), the time length of every stream object unit (SOBU) is sequentially recorded in the mapping list (MAPL). To be more specific, a count value counted at a constant time interval while a stream object unit (SOBU) is created, namely, the incremental application packet time (IAPAT) is recorded in the mapping entry field (MAPU_ENT) corresponding to the associated stream object unit (SOBU), as shown in FIGS. 4 and 5. In addition, the sum of a predetermined number of incremental application packet times (IAPATs) (the numbers parenthesized in FIG. 5) is calculated and the sum is recorded as a coarse mapping entry (C_MAP_ENT) which is coarse search time information.

The index number (INDEX_NO) of the first mapping entry (MAPU_ENT) of the mapping list (MAPL) or the first coarse mapping entry (C_MAPU_ENT) associated with the stream object (SOB) is recorded in the stream time map general information (STMAP_GI). In FIG. 5, the index number K of the first mapping entry related to the stream object SOB #n is recorded as identification information for indexing the location of the stream object SOB #n.

If a user requests retrieval of a certain interval of a data stream recorded on the recording medium, for example, recorded data corresponding to the time interval from 10th minute to 20th minute, the control unit 150 of the streamer 200 first searches Cells for a Cell (for example Cell 2 in FIG. 2) having a recording time corresponding to the start time of 10th minute. Then, the control unit 150 detects the index number pointing to the start position of the stream object SOB 2 corresponding to the chosen Cell 2 from the stream time map general information (STMAP_GI). Subsequently, the control unit 150 begins to detect the incremental application packet times (IAPATs), starting from the mapping entry pointed to by the index number. By summing the detected incremental application packet times (IAPATs) and multiplying the sum value by the unit time of each count, the start position of the stream object unit (SOBU) corresponding to the requested search time of the 10th minute can be found. Finally, data retrieval begins from the transport stream packet whose packet arrival time coincides with the requested time.

As another example, if a user requests retrieval of the recorded data corresponding to the time interval from 40 minutes to 60 minutes and the Cell having a recording time corresponding to the requested time 40 minutes is Cell 3, the control unit 150 detects the index number pointing to the start position of the stream object SOB 3 corresponding to the chosen Cell 3 from the stream time map general information (STMAP_GI). Subsequently, the control unit 150 begins to detect the incremental application packet times (IAPATs) listed in the mapping list MAPL 3. By summing the detected incremental application packet times (IAPATs) and multiplying the sum value by the unit time of each count, the start position of the stream object unit (SOBU) corresponding to the requested time 40 minutes can be found. Finally, data retrieval begins from the transport stream packet whose packet arrival time coincides with the requested time.

Figure 6:
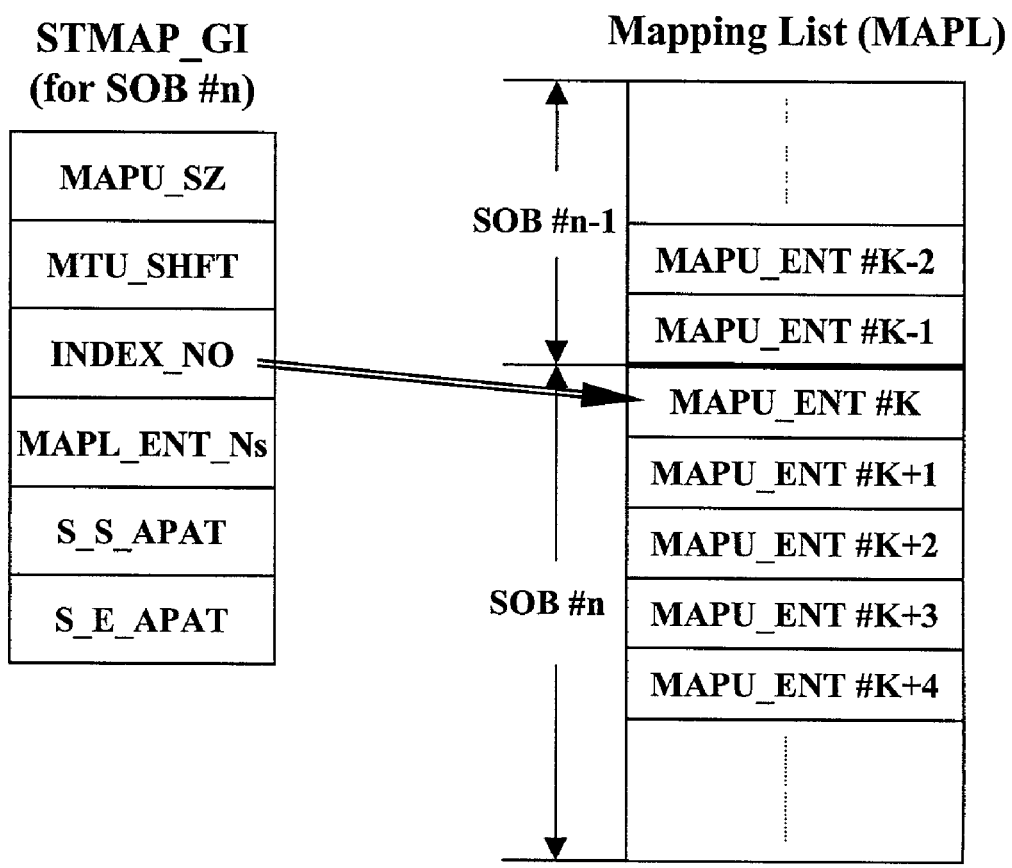
FIG. 6 illustrates a data organization diagram for explaining the management information created in accordance with a first embodiment of the present invention.
Figure 7:
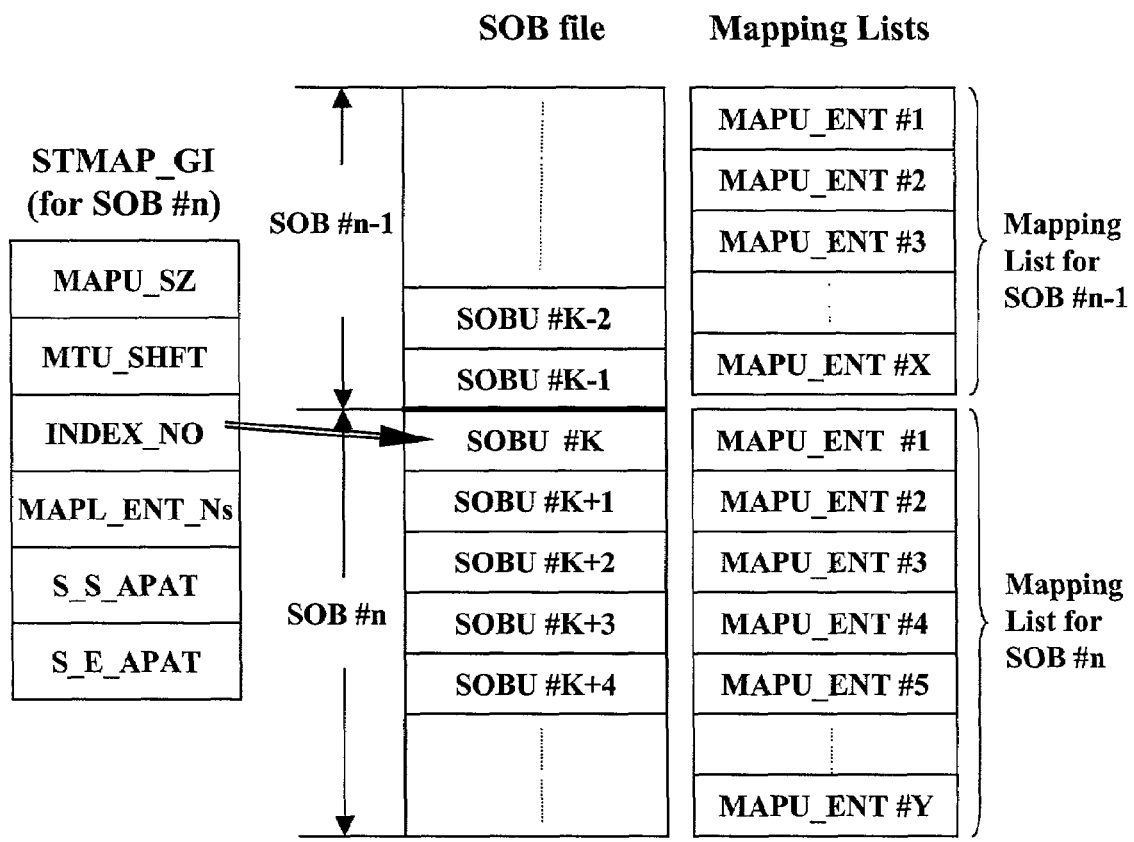
FIG. 7 illustrates a data organization diagram for explaining the management information created in accordance with a second embodiment of the present invention.

FIG. 6 illustrates a data organization diagram in accordance with a first embodiment of the present invention. FIG. 7 is a data organization diagram for explaining the management information created in accordance with a second embodiment of the present invention. According to the second embodiment, the streamer information file (streamer.IFO) preferably contains the stream time map general information (STMAP_GI) and the mapping list (MAPL) as described in reference to FIG. 2. The stream time map general information (STMAP_GI) is management information regarding the stream object units (SOBUs) and stream objects (SOBs) saved on the recording medium, such as a DVD. Each one of the stream objects (SOB) comprises a plurality of stream object units (SOBUs). The mapping list (MAPL) is time search information regarding the stream object units (SOBUs) and stream objects (SOBs). Similar to the first embodiment described above in connection with FIG. 2, each stream object (SOB) has a one-to-one correspondence with each Cell contained in the original playlist and each Cell is contained in the user-defined playlist and has a one-to-one correspondence with each stream object (SOB).

According to the embodiment shown in FIG. 7, the stream time map general information (STMAP_GI) comprises identical fields as in FIG. 5, except that the index number (INDEX_NO) indicates a starting address or number of the stream object units (SOBUs) for the corresponding stream object (SOB), in lieu of the mapping list (MAPL). The difference is shown in FIGS. 6 and 7, wherein FIG. 6 illustrates a data organization diagram for explaining the management information created in accordance with a first embodiment of the present invention. According to the present invention, the index number (INDEX_NO) preferably occupies 4 bytes.

In addition, instead of having one mapping list (MAPL) that contains a contiguously numbered mapping entry field (MAPU_ENT), an individual mapping list (MAPL) corresponding to each stream object (SOB) is preferred, as shown in FIG. 7. For example, referring to FIG. 7, for SOB #n-1, the mapping list comprises MAPU_ENT #1 to MAPU_ENT #X. Similarly, for SOB #n, the mapping list comprise MAPU_ENT #1 to MAPU_ENT #Y.

According to the second embodiment of the present invention, the SOB file shown in FIG. 7 is a file containing the entire list of stream object units (SOBUs). Preferably, each stream object unit (SOBU) has a corresponding mapping entry field (MAPU_ENT).

The index number (INDEX_NO) contained in a particular stream time map general information (STMAP_GI) table for the corresponding SOB stores the start SOBU number therein. For example, referring to FIG. 7, the INDEX_NO for STMAP_GI corresponding to SOB #n contains the number of the start stream object unit (SOBU), which is SOBU #K. In the preferred embodiment, the index number may be an address location (or SOBU offset address) of or an order of entry for the corresponding SOBU.

The method for creating and recording search information, which has been described above in reference to FIGS. 1, 2, and 3, is also applicable to the second embodiment, and thus will not be repeated. As an alternative to storing the first mapping entry (MAPU_ENT) in the INDEX_NO, the number of the start stream object unit (SOBU) associated with the stream object (SOB) is recorded in the index number (INDEX_NO) of the stream time map general information (STMAP_GI) for the same stream object (SOB).

If a user requests retrieval (by providing an externally defined search time) of a certain interval of a data stream recorded on the recording medium, for example, the recorded data corresponding to the time interval from $10^{th}$ minute to 20th minute, the control unit 150 of the streamer 200 first searches a plurality of Cells for a particular Cell (for example Cell 2 in FIG. 2) having a recording time corresponding to the start time of the 10th minute. Then, the control unit 150 detects the index number (which is the number of the start SOBU) pointing to the start position of the stream object SOB 2 corresponding to the chosen Cell 2 from the stream time map general information (STMAP_GI).

Because the number for the start SOBU for SOB 2 is immediately available, the start position of the stream object unit (SOBU) corresponding to the requested search time, namely, the 10th minute, is readily located. The control unit 150 then begins data retrieval from the transport stream packet whose packet arrival time coincides with the requested time.

The method for creating and recording search information for recorded digital data streams of the present invention enables rapid and precise search of a specific interval of the recorded digital data, provided that the digital data streams are recorded on a recording medium as groups of stream objects.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording search information for a digital data stream using a digital recording apparatus, the digital data stream being grouped into a plurality of stream object units, each stream object unit having a predetermined time length and at least one stream object unit forming a stream object, the method comprising:

preparing a stream time map information table associated with a stream object;

recording time length information for each stream object unit in a mapping list in a predefined order, the mapping list being separately maintained from the stream object; and recording index information in the stream time map information table of the stream object, wherein the index information comprises an index number to indicate at least one first stream object unit associated with a corresponding stream object.

2. The method of claim 1, wherein the time length information is expressed as a count value counted at a constant interval.

3. The method of claim 2, wherein the count value comprises a number incremented by one over each constant interval.

4. The method of claim 1, wherein the stream time map information table associated with the stream object comprises a stream object unit size, an index number, a number of mapping list entries, a start packet arrival time and a last packet arrival time.

5. The method of claim 1, wherein the mapping list comprises a first group of time length information and a second group of time length information, the first group associated with a first stream object and the second group associated with a second stream object.

6. A method for searching recorded digital data streams recorded in a recording medium comprising a mapping list and a stream object, the data streams stored in a plurality of stream object units, each stream object unit having a predetermined time length and at least one stream object unit forming a stream object, and the mapping list comprises time length information for each stream object unit, the recording medium further comprising a stream time map information table associated with the stream object, the stream time map information table comprising index information to indicate at least one first stream object unit associated with the stream object, the method comprising:

locating the stream time map information table corresponding to the stream object;

reading the index information of the stream time map information table, wherein the index information compnscs a number to locate the first stream object unit corresponding to the stream object; and locating the first stream object unit corresponding to the stream object.

7. The method of claim 6, further comprising the step of reading the time length information of the first stream object unit from the mapping list.

8. The method of claim 7, further comprising:

selecting the stream object based on an externally defined search time and the time length information read from the mapping list is accumulated with subsequent time length inforiyiation until a stream object unit corresponding to the externally defined search time is located.

9. The method of claim 8, further comprising the step of reproducing the recorded digital data stream from the stream object unit corresponding to the externally defined search time.

10. An apparatus for recording search information for a digital data stream on a recording medium, the apparatus comprising:

a recording device; and a control unit operatively connected to the recording device and configured to record the digital data stream by grouping the received digital data stream into a plurality of stream object units, each stream object unit having a predetermined time length, and at least one stream object unit forming a stream object;

generate a stream time map information table associated with a stream object on the recording medium;

record time length information for each stream object unit in a mapping list in a predefined order, the mapping list being separately maintained from the stream object; and record index information in the stream time map information table of the stream object, wherein the index information comprises an index number to indicate at least one first stream object unit associated with the stream object.

11. The apparatus of claim 10, wherein the time length information is expressed as a count value counted at a constant interval.

12. The apparatus of claim 11, wherein the count value comprises a number incremented by one over each constant interval.

13. The apparatus of claim 10, wherein the stream time map information table associated with the stream object comprises a stream object unit size, an index number, a number of mapping list entries, a start packet arrival time and a last packet arrival time.

14. The apparatus of claim 10, wherein the mapping list comprises a first group of time length information and a second group of time length information, the first group associated with a first stream object and the second group associated with a second stream object.

15. An apparatus for selectively searching recorded digital data streams recorded in a recording medium comprising a mapping list and a stream object, the data streams stored in a plurality of stream object units, each stream object unit having a predetermined time length and at least one stream object unit forming a stream object comprising, and the mapping list comprises time length information for each stream object unit, the recording medium further comprising a stream time map information table associated with each stream object, the stream time map information table comprising index information to locate a first stream object unit associated with a selected stream object, the apparatus comprising:

a reproducing device; and a control unit operatively connected to the reproducing device and configured to locate the stream time map information table corresponding to a stream object;

read the index information of the stream time map information table, wherein the index information comprises a number to indicate at least one first stream object unit corresponding to the stream object; and locate the first stream object unit corresponding to the selected stream object.

16. The apparatus of claim 15, the controller further configured to read the time length information of the first stream object unit from the mapping list.

17. The apparatus of claim 16, the controller further configured to select the stream object based on an externally defined search time and the time length information read from the mapping list is accumulated with subsequent time length information until a stream object unit corresponding to the externally defined search time is located.

18. The apparatus of claim 17, the controller further configured to reproduce the recorded digital data stream from the stream object unit corresponding to the externally defined search time.

19. A method for recording a data stream on a recording medium, the method comprising:

grouping the data stream into stream objects;

recording a playlist for the stream objects, the playlist recorded in a common information file of the recording medium; and recording stream time map information in a stream information file of the recording medium, the stream time map information comprising a mapping list having time search information for searching the stream objects, wherein the common information file recording the playlist and the stream information file recording the stream time map information are managed as separate files.

20. The method of claim 19, wherein the mapping list comprises a plurality of sub mapping lists, each of the sub mapping lists comprising time search information for searching the corresponding one of the stream objects.

21. The method of claim 19, further comprising recording a table of content in an application information file of the recording medium.

22. The method of claim 21, wherein the table of content comprises random-access entry point information that allows random access to the recorded data stream.

23. The method of claim 19, further comprising recording presentation sequence information of the recorded data stream in the common information file.

24. The method of claim 19, wherein recording the playlist comprises recording random-access entry point information that allows random access to the data stream as a part of the playlist.

25. An apparatus for recording a data stream on a recording medium, the apparatus comprising;
- a recording unit configured to record the, data stream by grouping the data stream into stream objects, to record a playlist for the stream objects in a common information file of the recording medium, and to record stream time map information in a stream information file of the recording medium, the stream time map information comprising a mapping list having time search information for searching the stream objects,
- wherein the common information file recording the playlist and the stream information file recording the stream time map information are managed as separate files.

26. The apparatus of claim 25, wherein each of the stream objects comprises a plurality of stream object units and the mapping list comprises the time search information for searching each of the stream object units.

27. The apparatus of claim 25, wherein the mapping list comprises a plurality of sub mapping lists, each of the plurality of sub mapping lists comprising the time search information for searching the corresponding one of the stream objects.

28. The apparatus of claim 25, wherein the recording unit records a table of content in an application information file of the recording medium.

29. The apparatus of claim 28, wherein the table of content comprises random-access entry point information that allows random access to the recorded data stream.

30. The apparatus of claim 25, wherein the recording unit records presentation sequence information of the recorded data stream in the common information file.

31. The apparatus of claim 25, wherein the recording unit further records random-access entry point information that allows random access to the data stream as a part of the playlist.

32. A method for reproducing a data stream from a recording medium, the data stream grouped into stream objects, the method comprising:
- reading a playlist for the stream, objects, the playlist recorded in a common information file of the recording medium; and
- reading stream time map information in a stream information file of the recording medium, the stream time map information comprising a mapping list having time search information for searching the stream objects,
- wherein the common information file recording the playlist and the stream information file recording the stream time map information are managed as separate files.

33. An apparatus for reproducing a data stream from a recording medium, the data stream grouped into stream objects, the apparatus comprising:
- a reproducing unit configured to read the data stream, to read a playlist for the stream objects in a common information file of the recording medium, and to read stream time map information in a stream information file of the recording medium, the stream time map information comprising a mapping list having time search information for searching the stream objects,
- wherein the common information file recording the playlist and the stream information file recording the stream time map information are managed as separate files.

* * * * *